United States Patent [19]
De Mars

[11] 3,717,355
[45] Feb. 20, 1973

[54] HYDRAULIC VEHICLE STABILIZER

[76] Inventor: Alfred J. De Mars, 11226 N.E. Couch Court, Portland, Oreg. 97220

[22] Filed: Sept. 8, 1970

[21] Appl. No.: 70,354

[52] U.S. Cl. .............................. 280/124 F, 267/11 A
[51] Int. Cl. ............................................. B60g 11/26
[58] Field of Search ................. 267/11 A; 280/124 F

[56] References Cited

UNITED STATES PATENTS

| 3,563,566 | 2/1971 | Weber | 267/11 A |
| 3,086,786 | 4/1963 | Tuczek | 267/11 A X |
| 3,090,611 | 5/1963 | Schultze | 267/11 A |
| 2,779,587 | 1/1957 | Thomas | 267/11 A |

Primary Examiner—Philip Goodman
Attorney—Oliver D. Olson

[57] ABSTRACT

Each of a pair of extensible hydraulic piston-cylinder units interconnecting the body frame and axle housing of a vehicle includes concentric inner and outer chambers communicating with each other adjacent one end, with the inner chamber confining a reciprocative piston. Passageways communicate one side of one of the pistons with the opposite side of the other piston to effect simultaneous extension or retraction of both units. A control valve associated with at least one of the units is operable from the operator's compartment of the vehicle selectively to communicate with and seal from each other the opposite sides of each piston. The pair of units may be separate from each other, or integrated into a unitary, back-to-back dual cylinder unit.

12 Claims, 10 Drawing Figures

3,717,355
Patented Feb 20 1973
Sheet 1 of 2
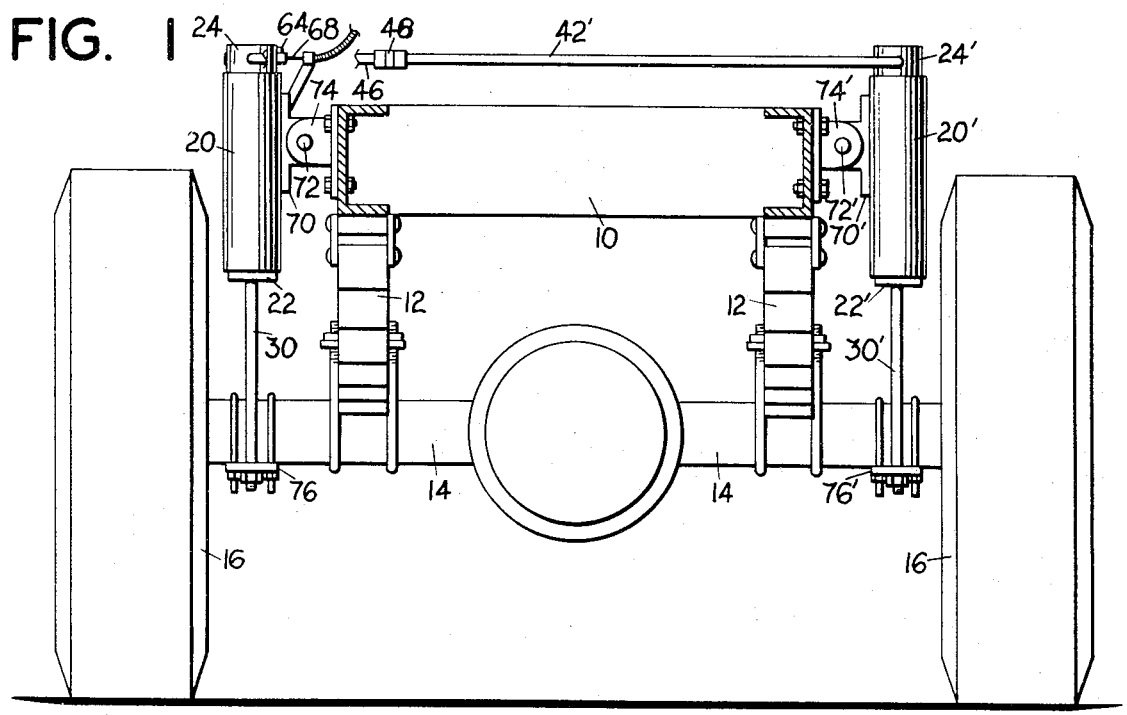
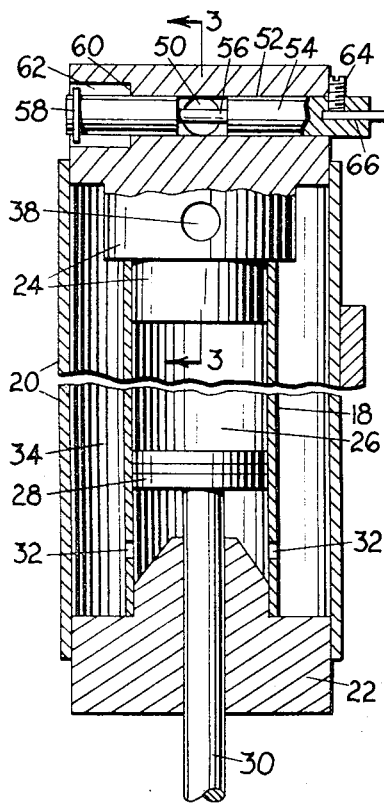
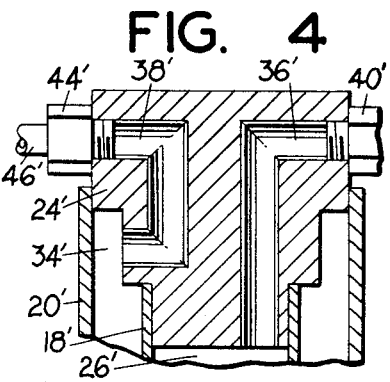
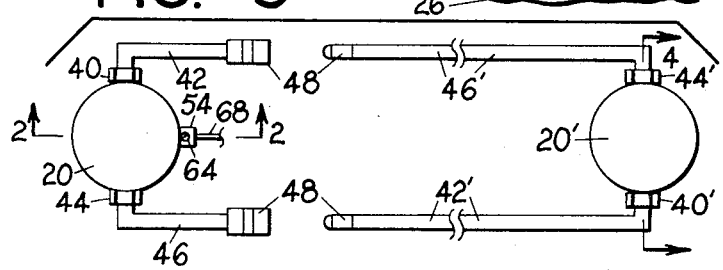
ALFRED J. DEMARS
INVENTOR.
BY Oliver D. Olson
AGENT

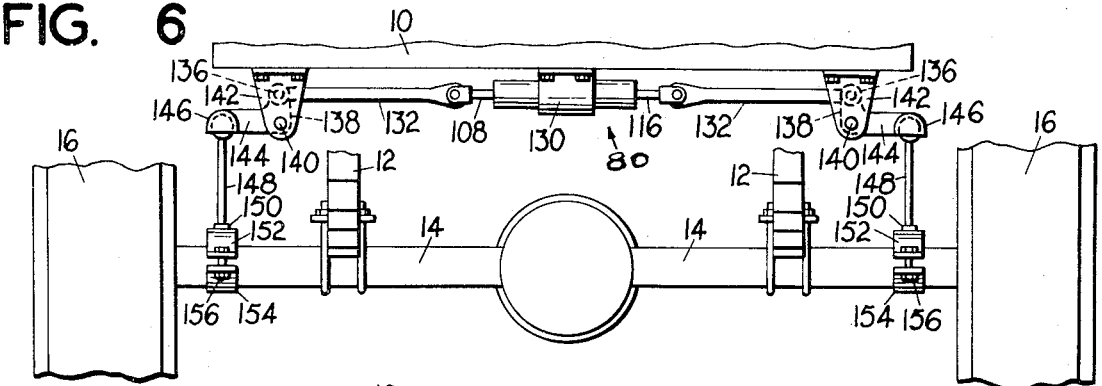
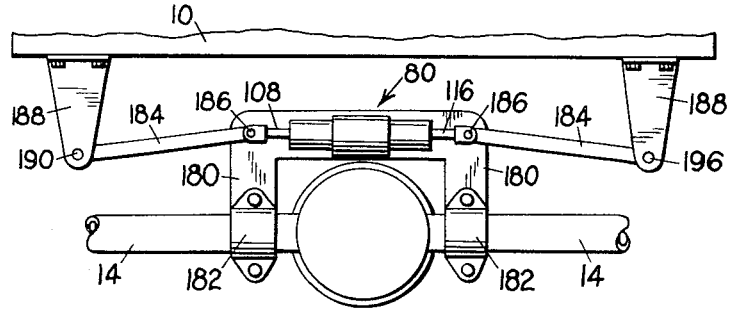
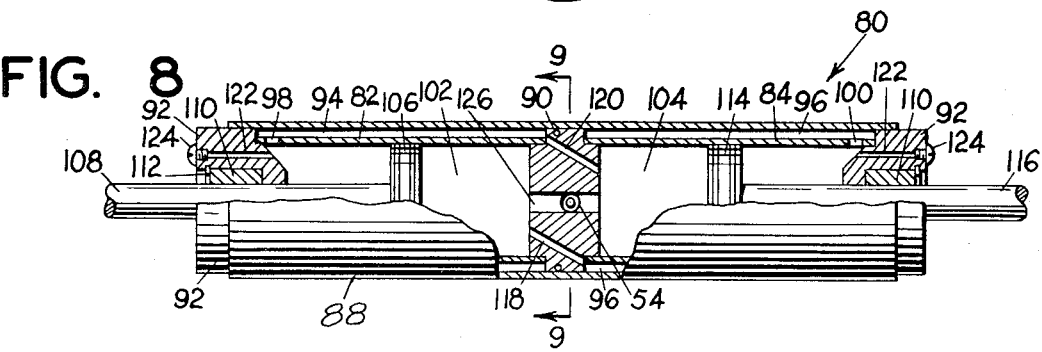
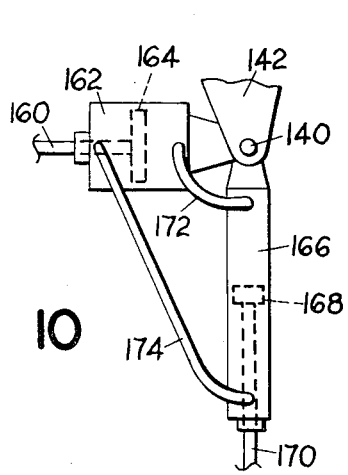
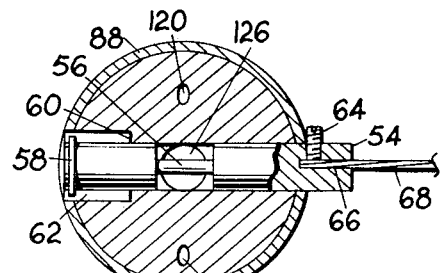
ALFRED J. DEMARS
INVENTOR.

3,717,355

HYDRAULIC VEHICLE STABILIZER

BACKGROUND OF THE INVENTION

This invention relates to hydraulic vehicle stabilizers for eliminating lateral shifting and tilting of a vehicle body relative to its wheel-mounting axle housing, and more particularly to such a stabilizer having an adjustable control operable from the remote location of the vehicle operator.

Hydraulic vehicle stabilizers provided heretofore are characterized by structures which limit their applicability to vehicles of only those types and constructions which provide sufficient clearance between components of the vehicle, which are difficult and time consuming to install, which are susceptible of damage and consequent malfunction, and which are not adjustable to accommodate optimum operation of the vehicle under varying load conditions and over roads and terrains of diverse character.

SUMMARY OF THE INVENTION

In its basic concept, the vehicle stabilizer of this invention utilizes a pair of extensible hydraulic piston-cylinder units having self-contained fluid passageways interconnected to extend and retract both units simultaneously and provided with a control valve for adjusting selectively the hydraulic coupling between the units.

It is by virtue of the foregoing basic concept that the principal objective of this invention is achieved; namely, to overcome the aforementioned disadvantages of prior stabilizers.

Another important object of this invention is the provision of a vehicle stabilizer of simplified and compact construction which may be attached to various types of vehicles in any one of a variety of ways most suitable to the structural characteristics of a particular vehicle and with minimum modification of the latter.

A further important object of this invention is the provision of a hydraulic vehicle stabilizer in which the hydraulic coupling between a pair of piston-cylinder units is adjustable from the remote position of a vehicle operator.

The foregoing and other objects and advantages of this invention will appear from the following detailed description, taken in connection with the accompanying drawings of the preferred embodiments.

BRIEF DESCRIPTION OF THE DRAWINGS

FIG. 1 is a fragmentary vertical elevation, partly in section, of the rear end of a vehicle showing mounted thereon a hydraulic vehicle stabilizer embodying the features of this invention.

FIG. 2 is a foreshortened, fragmentary vertical section showing structural details of the hydraulic piston-cylinder unit at the left in FIG. 1.

FIG. 3 is a fragmentary sectional view taken on the line 3—3 in FIG. 2.

FIG. 4 is a fragmentary sectional view similar to FIG. 3 but of the other hydraulic piston-cylinder unit of the pair.

FIG. 5 is a foreshortened plan view of the stabilizer assembly as viewed from the top of FIG. 1.

FIG. 6 is a fragmentary vertical elevation of the rear end of a vehicle showing mounted thereon a second embodiment of the hydraulic vehicle stabilizer of this invention.

FIG. 7 is a fragmentary vertical elevation, similar to FIG. 6, showing mounted on the rear end of a vehicle a further modified form of hydraulic vehicle stabilizer embodying the features of this invention.

FIG. 8 is a fragmentary, foreshortened vertical elevation, partly in section, showing details of internal construction of a dual hydraulic piston-cylinder unit utilized in the stabilizers of FIGS. 6 and 7.

FIG. 9 is a transverse sectional view taken on the line 9—9 in FIG. 8.

FIG. 10 is a fragmentary vertical elevation of a still further modified form of piston operator between the dual hydraulic piston-cylinder unit and vehicle axle housing of the stabilizer illustrated in FIG. 6.

DESCRIPTION OF THE PREFERRED EMBODIMENTS

In the drawings there is shown for purposes of illustration the rear view of a vehicle which includes a body frame 10 mounted resiliently by springs 12 on an underlying axle housing 14 supported by rear wheels 16.

In the embodiment illustrated in FIGS 1-5 the stabilizer includes a pair of hydraulic piston-cylinder units which are interconnected in such manner that extension or retraction of one of the units effects simultaneous and corresponding extension or retraction of the other unit. Further, the units are constructed in such manner that their interconnections is made at the upper end of the units. By this means the stabilizer assembly may be mounted on vehicles which provide minimum space therefor, while simultaneously locating all exposed hydraulic lines removed as far as possible from flying objects or other causes of damage.

The basic construction of both hydraulic piston-cylinder units is best illustrated in FIG. 2. Since this is the left hand unit, corresponding components of the right hand unit are identified by the same reference numerals but distinguished by a super-script. The unit comprises a pair of concentric, elongated cylinders 18 and 20 which are sealed at their opposite ends by means of end closure plugs 22 and 24. The inner cylinder 18 defines a hydraulic fluid chamber 26 in which a piston 28 is confined for longitudinal reciprocation. A piston rod 30 is secured to one side of the piston and extends outward of the cylinder unit slidably through the end closure plug 22.

At least one, and preferably a plurality of circumferentially spaced openings 32 through the inner cylinder 18 adjacent the plug 22. These openings communicate the inner chamber 26 with an outer annular chamber 34 defined between the radially spaced inner and outer cylinders, on the piston rod side of the piston. The opposite end plug 24 is provided with a pair of fluid passageways 36 and 38 (FIGS. 3 and 4). The passageway 36 communicates with the inner chamber 26 on the side of the piston opposite the piston rod. The other passageway 38 communicates with the outer chamber 34.

The outer end of the passageway 36 is provided with a fitting 40 for connecting one end of a fluid conduit 42. The outer end of the other passageway 38 is provided with a fitting 44 for connecting one end of a second conduit 46. The outer ends of the conduits are provided with coupling members 48 (FIG. 5), preferably of the quick disconnect type. Thus, the outer end of each conduit 42 is connected to the outer end of each conduit 46, to couple together hydraulically the two piston-cylinder units of the stabilizer assembly. In this regard it is to be noted that by this arrangement of conduit couplings the side of the inner chamber 26 opposite the piston rod 30 of each unit communicates with the outer annular chamber 34 of the other unit. Accordingly, with the assembly filled with hydraulic fluid, as explained hereinafter, extension or retraction of one of the piston-cylinder units effects simultaneous and corresponding extension or retraction of the other unit.

Means is provided for controlling the hydraulic coupling between the piston-cylinder units. In the embodiment illustrated, and best shown in FIGS. 2 and 3, such control means is provided by a valve-controlled by-pass passageway 50 in the end plug 24 of the left-hand piston-cylinder unit. This by-pass passageway interconnects the passageways 36 and 38 in said end plug. Traversing the by-pass passageway intermediate the ends thereof and therefore between the passageways, is a valve bore 52.

A valve member 54, having an intermediate portion 56 of reduced diameter, is mounted in the valve bore slidably for longitudinal reciprocation between by-pass passageway opening and closing positions. In the opening position (FIG. 2) said intermediate, reduced portion 56 traverses the by-pass passageway 50 and thus opens the latter. In the closing position, the left end portion of the valve member traverses the by-pass passageway and thus closes the latter.

The closed position of the valve member is established by abutment of a snap ring 58 adjacent one end of the valve member with a shoulder 60 formed at the inner end of an enlarged diameter counter bore 62. The open position of the valve member is established by abutment of a projecting stop member 64 on the valve member with the end plug 24.

Conveniently, the stop member is provided in the form of a set screw in a threaded radial bore which intercepts a longitudinal bore 66 in the valve member. This longitudinal bore receves one end of an elongated flexible control cable 68 which is secured therein by means of the set screw. The cable thus may extend to a position remote from the piston-cylinder unit, for remote actuation of the valve member. This remote location preferably is in the operator compartment of the vehicle, to enable the operator to adjust the valve member selectively between said open and closing positions during operation of the vehicle.

It will be understood that when the valve member is in the closing position, closing the by-pass passageway, the air of piston-cylinder units are coupled together hydraulically in the manner previously described to effect simultaneous extension or retraction of the units. However, when the valve member is moved to open position illustrated in FIG. 2 the inner and outer chambers of both piston-cylinder units communicate freely with each other. Accordingly, the pistons of both units may move freely within their associated inner chambers, since the opposite sides of each piston communicate with each other through the opened by-pass passageway.

Varying degrees of hydraulic coupling between the units may be achieved by adjusting the position of the valve member to varying degrees of restriction of the by-pass passageways.

The stabilizer assembly illustrated in FIG. 1 is filled with hydraulic fluid when the pistons of both units are at their uppermost positions in the inner chambers, i.e., with both piston-cylinder units fully retracted. Filling of the units with hydraulic fluid may be done before installation on a vehicle, since the quick disconnect couplings close the outer ends of the conduits when the couplings are in disconnected condition.

The hydraulic stabilizer assembly illustrated in FIG. 1 is mounted on a vehicle in the following manner: The outer cylinder 20 of each piston-cylinder unit is provided with a laterally extending mounting bracket 70 for pivotal connection through a pivot pin 72 to a corresponding mounting bracket 74 secured to opposite lateral sides of the body frame 10 of a vehicle. The projecting end of the associated piston rod 30 extends downward from the cylinder and is connected to a clamp 76 secured to the axle housing 14 of the vehicle. The pair of piston-cylinder units thus are mounted in spaced-apart relation adjacent opposite lateral sides of the vehicle. The hydraulic conduits 42 and 46 extend transversely of the vehicle between the upper ends of the cylinder units and are connected together by means of the couplings 48 explained hereinbefore. The conduits, which cooperate with passageways and chambers formed within each unit, thus are the only components of the hydraulic fluid coupling between the units that are exposed to flying objects and other damage. However, they are located only at the upper ends of the units and thus are protected to maximum degree.

The operation of the stabilizer illustrated in FIG. 1 is as follows:

Let it be assumed, for purpose of explanation, that the vehicle is making a turn to the right, thereby imposing forces tending to move the body frame 10 toward the left with respect to the axle housing 14 and also tending to move the left side of the body frame downward and the right side of the body frame upward with respect to the axle housing.

As the body tends to move toward the left and its left side tends to move downward, the left hand cylinder unit tends to retract. Thus, upward movement of the associated piston 28 forces hydraulic fluid from the upper portion of the inner chamber 26 through the outer annular chamber 34' of the other piston-cylinder unit and thence through the openings 32' in the inner cylinder 18' into the piston rod side of the inner chamber 26' of said other unit. This results in simultaneous retraction of said other piston-cylinder unit at the right hand side of the vehicle. The right hand side of the vehicle body thus is drawn downward to maintain it level with the left side.

When the vehicle is to be moved over extremely rough terrain, for example, where stabilization is impossible, it may be desirable to uncouple the stabilizer assembly to eliminate the severe strains on the vehicle by allowing the body to be supported for movement on the supporting springs 12, under the control of conventional shock absorbers. Uncoupling of the stabilizer assembly is effected by moving the valve member 54 to the open position previously described. In this regard it is to be understood that for normal operation of the stabilizer assembly this control valve is positioned to close the by-pass passageway 50.

Many types of vehicles, such as motor homes, vans and trailers, are characterized by constructions which provide limited space between the vehicle body frame 10 and axle housing 14. For such purposes the stabilizer constructions illustrated in FIGS. 6–10 are preferred. In those embodiments the separate pair of piston-cylinder units described hereinbefore are integrated into a unitary, back-to-back dual cylinder unit 80 best illustrated in FIG. 8.

Thus, a pair of inner cylinders 82 and 84 are arranged end-to-end and provided with a common inner wall 86. The opposite end portions of the wall are reduced in diameter to provide seats for the inner end of the cylinders which are sealed thereto by a press fit, by welding, by resilient O-rings, or by any other suitable means.

The assembly of inner cylinders and common wall is received within an elongated outer cylinder 88. The enlarged central portion of the common wall is sealed to the inner surface of the outer cylinder by such means as the O-ring seal 90.

An end wall 92 is received within each of the opposite ends of the outer cylinder to close the latter. A fluid tight seal is provided between the outer cylinder and end wall by welding, by resilient O-ring seals, or by other suitable means. An inner portion of each end wall is reduced in diameter to form a supporting seat for the outer end of each of the inner cylinders. Thus, there is provided an annular passageway 94 between the inner cylinder 82 and outer cylinder 88, and a similar passageway 96 between the inner cylinder 84 and outer cylinder. At least one opening 98, 100 is provided adjacent the outer end of each of the inner cylinders 82 and 84, respectively, to provide communication between the annular passageways 94, 96 and piston chambers 102 and 103, within the inner cylinders 82 and 84, respectively.

It will be understood that the outer ends of the inner cylinders may be terminated inwardly of the end walls 92 to provide communication between the passageways and piston chambers. The arrangement illustrated is preferred, however, for the support provided the outer ends of the inner cylinders by the end walls.

A piston 106 is mounted in the chamber 102 of the inner cylinder 82 for longitudinal reciprocation between the common inner wall 86 and the associated end wall 92. A piston rod 108 secured to the piston extends outward slidably through an opening in the end wall. A fluid tight seal is provided between the piston rod and end wall by such means as a bushing 110 retained removably in the counter bore of the end wall by such means as a keeper ring 112 seated removably in an annular groove in the end wall.

Similarly, a piston 114 is confined within the piston chamber 104 of the inner cylinder 84 for longitudinal reciprocation between the common inner wall and the associated end wall. A piston rod 116 secured to the piston projects longitudinally outward through a bore in the end wall, a fluid tight seal therebetween being provided by a bushing 110.

At least one and preferably a plurality of passageways 118 are provided in the common inner wall 86 to communicate the inner end of the piston chamber 102 with the annular passageway 96 associated with the opposite inner cylinder 84. Similarly, the common inner wall is provided with at least one passageway 120 to communicate the inner end of the piston chamber 104 with the annular passageway 94 associated with the opposite inner cylinder 82. By this means movement of one of the pistons in one longitudinal direction effects movement of the other piston in the opposite longitudinal direction, i.e., both piston-cylinder units extend or retract simultaneously.

For example, if the piston 106 is moved longitudinally outward, by the application of a pulling force on the outer end of the associated piston rod 108 hydraulic fluid in the chamber 102 on the rod side of the piston is forced through the opening 98 into the associated annular passageway 94, thence through the communicating passageway 120 into the piston chamber 104 of the opposite inner cylinder 84 on the inner side of the associated piston 114, thereby forcing the latter longitudinally outward.

Each end wall 92 is provided with a passageway 122 therethrough for the purpose of filling the cylinder unit with hydraulic fluid as well as for the purpose of bleeding air from the unit. A threaded screw plug 124 removably seals each passageway. Filling of the unit with hydraulic fluid is effected when both piston-cylinder units are fully retracted, i.e., when both pistons are moved fully inward toward the common inner wall.

Means also preferably are provided for releasably communicating the opposite sides of each piston with each other, for the same purpose previously described in connection with the by-pass passageway 50. In the embodiment illustrated in FIG. 8 such means is provided by the by-pass passageway 126 through the common inner wall 86. An adjustable control valve is associated with the by-pass passageway for releasably closing the latter. The valve illustrated is similar to the valve 54 previously described and therefore its components are identified by the same reference numerals.

The control valve functions in manner analogous to the control valve previously described, to communicate the opposite sides of each piston 106, 114 with each other. Thus, for example, with the control valve in open position, opening the by-pass passageway 126, the side of the piston 106 opposite its piston rod communicates with its piston rod side through the open by-pass passageway 126, the inner chamber 104, the passageway 120, the annular chamber 94 and the openings 98. In similar manner, the side of the piston 114 opposite its piston rod communicates with its piston rod side through the open by-pass passageway 126, the inner chamber 102, the passageway 118, the annular outer chamber 96 and the openings 100.

Referring now to FIG. 6, the dual cylinder unit 80 is secured to a mounting bracket 130 which in turn is secured to the underside of the vehicle body frame 10, centrally thereof, by such means as the attaching bolts illustrated. The cylinder unit is disposed transversely of the vehicle with the piston rods extending in opposite directions toward opposite lateral sides of the vehicle.

Means is provided for interconnecting each piston rod and the axle housing member 14 for operating the associated piston by relative movement of the vehicle body frame and axle housing. In the embodiment illustrated, such means comprises a link 132 connected pivotally at its inner end to the outer end of the associated piston rod by means of a pivot pin 134. The outer end of the link is connected, as by a pivot pin 136 to one arm 138 of a bell crank lever. The lever is mounted pivotally intermediate its ends on a pivot pin 140 which is supported by a bracket 142 secured to the underside of the vehicle body by such means as the bolts illustrated. It is to be noted that the pair of brackets are secured to the vehicle body frame adjacent the opposite lateral sides thereof.

The other arm 144 of the bell crank lever is connected pivotally, as by universal joint 146 to the upper end of a link 148. The lower end of this link is connected pivotally, as by means of universal joint 150, to the upper section 152 of a mounting clamp which overlaps the upper portion of the axle housing 14. The lower section 154 of the clamp underlies the axle housing and the two sections are secured together in clamping relation by means of clamping bolts 156. It is to be noted that the pair of clamps are secured to the axle housing adjacent the lateral sides of the vehicle.

The operation of the stabilizer illustrated in FIG. 6 is as follows:

Let it be assumed that the vehicle is making a turn to the right, thereby imposing forces tending to move the body frame 10 toward the left with respect to the axle housing 14 and also tending to move the left side of the body frame downward and the right side of the body frame upward with respect to the axle housing.

As the body frame tends to move toward the left and its left side tends to move downward, the left hand bell crank lever is caused to rotate clockwise about its pivot pin 140, pushing the left hand piston rod 108 inward of the cylinder unit 80. This results in simultaneous inward movement of the right hand piston rod 116 with resulting counterclockwise rotation of the right hand bell crank lever about its pivot pin 140. This counterclockwise rotation of the right hand bell crank lever provides a force which counteracts the tendency of leftward movement of the body and also draws the right hand side of the body downward to maintain it level with the left side.

In the embodiment illustrated in FIG. 6 the distance between the pivot pins 136 and 140 is shorter than the distance between the pivot pin 140 and universal joint 146. Thus, a given distance of relative vertical movement between the vehicle body frame and axle housing results in a correspondingly shorter distance of movement of the associated piston in the dual cylinder unit. Although these relative distances may be varied over a considerable range, it has been found for most vehicle installations a ratio of approximately one to three for the distance between the pivot pins 136, 140 and the distance between the pivot pin 140 and universal joint 146, is quite suitable.

FIG. 10 illustrates in modified form of piston operating assembly which may be substituted for the links and bell crank lever assemblies illustrated in FIG. 6. Thus, each piston rod of the dual cylinder unit is connected to a piston rod 160 projecting from one end of a cylinder 162 in which a piston 164 reciprocates. The cylinder is mounted on the vehicle body frame 10, conveniently by the pivot pin 140 carried by the bracket 142. This pivot pin also supports the upper end of a second cylinder 166 in which piston 168 reciprocates. The piston rod 170 connected to this piston projects from the opposite end of the cylinder and is connected to the clamp section 152 (FIG. 6) by such means as the universal joint 150.

The inner ends of the cylinders 162 and 166 communicate with each other through a flexible conduit 172 and the outer ends of the cylinders communicate with each other through a flexible conduit 174. It will be understood that these piston-cylinder units may be constructed in the manner of those illustrated in FIG. 2, to provide hydraulic coupling at the adjacent ends of the cylinders. In such event, it will be understood that the by-pass control valve assembly need not be provided.

Let it be assumed that the assembly illustrated in FIG. 10 in incorporated in the stabilizer system illustrated in FIG. 6 and a left turn of the vehicle tends to move the body frame 10 toward the right and the right side of the body frame downward toward the axle housing 14. This motion results in upward retraction of the piston rod 170 into the right hand cylinder 166. Hydraulic fluid thus is forced through the conduit 172 into the cylinder 162 ahead of the piston 164, thereby effecting outward extension of the piston rod 160 and inward retraction of the connected piston rod 112 at the right side of the dual cylinder unit 80. Simultaneous inward retraction of the left hand piston rod 108 of the dual cylinder unit thereby effects outward extension of the connected piston rod 160 of the cylinder 162 mounted at the left side of the vehicle frame. Hydraulic fluid thus is forced through the flexible conduit 174 into the bottom end of the associated cylinder 166 to effect upward retraction of the associated piston rod 170. Thus, the left side of the vehicle body frame is drawn downward toward the axle housing to maintain the body frame level.

It is to be noted in the embodiment illustrated in FIG. 10 that the cylinders 162 and 166 are proportioned to provide a shorter distance of travel of the piston 164 connected to the associated piston rod of the dual cylinder unit 80 than the travel of the piston connected to the axle housing 14, in manner similar to the arrangement of pivotal connections of the bell crank levers illustrated in FIG. 6.

In the embodiment illustrated in FIG. 7 the dual hydraulic cylinder unit 80 is mounted on the axle housing 14 centrally thereof by means of mounting bracket 180 and securing clamps 182. The cylinder unit is disposed transversely of the vehicle and each of the oppositely extending piston rods 108 and 116 is connected at its outer end pivotally to the inner end of a link 184, by mens of a pivot pin 186. The outer end of the link is connected to a bracket 188 by means of a pivot pin 190. The pair of brackets are secured to the underside of the vehicle body frame 10 adjacent the opposite lateral sides thereof, by such means as the bolts illustrated.

The stabilizer arrangement illustrated in FIG. 7 operates in manner similar to the stabilizer illustrated in FIG. 6 and described hereinbefore. Thus, for example, movement of the body frame 10 toward the left and downward toward the axle housing 14 results in extension of the left hand piston rod 108 outward from the cylinder unit 80. This outward movement of the left hand piston rod effects outward movement of the right hand piston rod 116 in the opposite direction. It is to be noted here that the links 184 interconnecting the piston rods and brackets extend laterally outward and downward from the cylinder unit. Accordingly, outward movement of the right hand position rod provide the force at the connecting pivot pin 190 which not only opposes leftward movement of the body frame, but also draws the right side of the body frame downward toward the axle housing 14 to maintain the body frame level.

From the foregoing it will be appreciated that the hydraulic vehicle stabilizer of this invention is of simplified, self-contained construction in which external hydraulic interconnections, which characteristically are subject to breakage and other damage or are otherwise susceptible of leakage, are minimized. Control of hydraulic coupling between piston-cylinder units, conveniently from the remote position of the vehicle operator-compartment, compartment, affords optimum operation of the stabilizer under varying conditions of load and terrain. Various structural arrangements are available for selection to accommodate various types of vehicle constructions. Thus, where clearance between a vehicle body frame and the underlying axle housing is a minimum, the vehicle stabilizer assembly illustrated in FIG. 6 is preferred. The arrangements illustrated in FIGS. 1 and 7 are more suitable for vehicles which provide greater clearance. In all instances, installation is made with speed and facility and with minimum modification of the vehicle.

It will be apparent to those skilled in the art that various changes in the size, shape, number, type and arrangement of parts described hereinbefore may be made without departing from the spirit of this invention.

Having now described my invention and the manner in which it may be used, I claim:

1. A stabilizer for a vehicle having a body frame member and a wheel axle housing movable relative to each other, the stabilizer comprising
   a. a pair of extensible hydraulic piston-cylinder units each comprising
      1. an elongated cylinder defining a piston chamber,
      2. a piston reciprocative in the chamber, and
      3. a piston rod extending from the piston outward slidably through one end of the cylinder,
   b. passageway means communicating the piston rod side of each chamber with the opposite side of the other chamber,
   c. hydraulic fluid filling said chambers and passageways when both piston-cylinder units are fully retracted, and
   d. connecting means on the cylinder and piston rod of each unit for connecting them one to each of the body frame and axle housing members of a vehicle.

2. The stabilizer of claim 1 wherein
   a. each piston-cylinder unit includes concentric inner and outer chambers, and end closure means closes the opposite ends of said chambers,
   b. the passageway means comprises
      1. first fluid passageway means communicating one end of the inner and outer chambers with each other,
      2. second fluid passageway means in one of the end closure means communicating with the inner chamber,
      3. third fluid passageway means in said one end closure means communicating with the outer chamber, and
      4. conduit means communicating the second passageway means of each unit with the third passageway means of the opposite unit,
   c. by-pass passageway means in said one end closure means of one of the units communicating the associated second and third passageway means with each other, and
   d. by-pass control valve means in the by-pass passageway means and movable between a closing position closing the by-pass passageway means and an opening position opening the by-pass passageway means.

3. The stabilizer of claim 2 including valve operator means engaging the control valve means and operable from a position remote from the piston cylinder unit.

4. The stabilizer of claim 3 wherein the valve operator means comprises an elongated flexible cable connected at one end to the valve means.

5. The stabilizer of claim 1 wherein
   a. the pair of piston-cylinder units are integrated as a dual unit comprising an elongated body confining a pair of pistons reciprocative therein simultaneously in opposite longitudinal directions, the piston rods extending outward from the body in opposite longitudinal directions, and
   b. the connecting means comprises
      1. mounting means securing the cylinder unit to one of the vehicle body frame and axle housing members centrally thereof with the piston rods extending toward opposite lateral sides of the vehicle, and
      2. a pair of piston operating means each interconnecting one of the piston rods and one of said vehicle body frame and axle housing members adjacent the corresponding lateral side of the vehicle,
      3. each piston operating means including pivot means mounted on the vehicle body frame member adjacent the corresponding lateral side thereof for movement therewith.

6. The stabilizer of claim 5 wherein the mounting means is secured to the vehicle body frame member and the piston operating means are secured to the vehicle axle housing member.

7. The stabilizer of claim 6 wherein the pair of piston operating means each comprises
   a. a vehicle axle housing mounting member,
   b. a vehicle body frame mounting member,
   c. a bell crank lever,
   d. pivot means securing the bell crank lever intermediate its ends to the vehicle body frame mounting member,
   e. a first link member pivotally interconnecting one arm of the lever and the associated piston rod, and
   f. a second link member pivotally interconnecting the other arm of the lever and the associated axle housing mounting member,
   g. the pair of vehicle axle housing mounting members being secured to the vehicle axle housing member adjacent the lateral sides thereof, and h. the pair of vehicle body frame mounting members being secured to the vehicle body frame member adjacent the lateral sides thereof.

8. The stabilizer of claim 6 wherein the pair of piston operating means each comprises
   a. a vehicle axle housing mounting member,
   b. a vehicle body frame mounting member,
   c. a first hydraulic cylinder connected to one end to the associated piston rod of the cylinder unit and at the opposite end to the associated vehicle body frame mounting member,
   d. a second hydraulic cylinder connected pivotally at one end to the associated vehicle axle housing mounting member and at the opposite end to the associated vehicle body frame mounting member, and
   e. conduit means communicating the opposite ends of the first and second cylinder units with each other such that retraction of the first hydraulic cylinder effects extension of the second hydraulic cylinder,
   f. the pair of vehicle axle housing mounting members being secured to the vehicle axle housing member adjacent the lateral sides thereof, and
   g. the pair of vehicle body frame mounting members being secured to the vehicle body frame member adjacent the lateral sides thereof.

9. The stabilizer of claim 5 wherein the mounting means is secured to the vehicle axle housing member and the piston operating means are secured to the vehicle body frame member.

10. The stabilizer of claim 9 wherein the pair of piston operating means each comprises a bracket and a link member connected pivotally at one end to the bracket and at the opposite end to the associated piston rod, the brackets being secured to the vehicle body frame member adjacent the lateral sides thereof.

11. The stabilizer of claim 5 wherein the dual unit comprises
   a. a pair of inner cylinders arranged end to end and having a common inner wall,
   b. an outer cylinder surrounding the inner cylinders in spaced relation thereto,
   c. outer end walls closing the opposite ends of the outer cylinder,
   d. means sealing the inner wall to the outer cylinder intermediate the ends of the latter, defining a pair of longitudinally spaced annular passageways one associated with each inner cylinder,
   e. passageway means adjacent the outer end of each inner cylinder communicating the latter with its associated annular passageway,
   f. passageway means in the inner wall communicating the inner end of each inner cylinder with the annular passageway associated with the other inner cylinder,
   g. a piston reciprocative in each inner cylinder, and
   h. a piston rod on each piston extending outward slidably through the associated outer end wall of the outer cylinder.

12. The stabilizer of claim 11 including
   a. bypass passageway means in the inner wall communicating the inner ends of the inner cylinders with each other, and
   b. valve means in the inner wall releasably closing said bypass passageway means.

* * * * *